United States Patent
Mozes et al.

(10) Patent No.: US 12,179,221 B2
(45) Date of Patent: Dec. 31, 2024

(54) SPIRAL-SHAPED SEPARATION DEVICE FOR FLUID PURIFICATION DEVICE

(71) Applicant: Paques I.P. B.V., Balk (NL)

(72) Inventors: Erik Mozes, Balk (NL); Wilhelmus Johannes Bernardus Maria Driessen, Balk (NL); Jelle Faber, Balk (NL); René Alexander Rozendal, Balk (NL); Wiebe Abma, Balk (NL)

(73) Assignee: Paques I.P. B.V., Balk (NL)

( * ) Notice: Subject to any disclaimer, the term of this patent is extended or adjusted under 35 U.S.C. 154(b) by 18 days.

(21) Appl. No.: 17/620,130

(22) PCT Filed: Jun. 24, 2020

(86) PCT No.: PCT/EP2020/067626
§ 371 (c)(1),
(2) Date: Dec. 17, 2021

(87) PCT Pub. No.: WO2020/260354
PCT Pub. Date: Dec. 30, 2020

(65) Prior Publication Data
US 2022/0258183 A1    Aug. 18, 2022

(30) Foreign Application Priority Data
Jun. 27, 2019   (EP) .................................... 19182934

(51) Int. Cl.
*B04C 5/103* (2006.01)
*B01D 19/00* (2006.01)
(Continued)

(52) U.S. Cl.
CPC .......... *B04C 5/103* (2013.01); *B01D 19/0042* (2013.01); *B01D 21/0003* (2013.01);
(Continued)

(58) Field of Classification Search
None
See application file for complete search history.

(56) References Cited

U.S. PATENT DOCUMENTS

| 513,090 A | * 1/1894 | Day ....................... B04C 5/103 |
| | | 55/399 |
| 4,737,282 A | 4/1988 | Senyard, Sr. et al. |
| | (Continued) | |

FOREIGN PATENT DOCUMENTS

| CN | 101878057 A | 11/2010 |
| CN | 101918143 A | 12/2010 |
| | (Continued) | |

*Primary Examiner* — Bradley R Spies
*Assistant Examiner* — Jeannie McDermott
(74) *Attorney, Agent, or Firm* — N.V. Nederlandsch Octrooibureau

(57) ABSTRACT

A separation device for a fluid purification device is provided, the separation device comprising: at least three concentric enclosures including an outermost enclosure and an innermost enclosure and defining at least two concentric cavities; a plurality of spiral-shaped channels formed in each of the at least two concentric cavities, so that fluid can flow through said plurality of spiral-shaped channels; a fluid inlet, for receiving fluid, located in an upper section of an outermost cavity among the at least two concentric cavities, the fluid inlet corresponding to a gas outlet; a solids outlet, for discharging solids comprised in the fluid, located in a lower section of the separation device; and a liquid outlet, for discharging liquid comprised in the fluid, located in an upper section of at least one inner cavity among the at least two concentric cavities.

18 Claims, 5 Drawing Sheets

(51) Int. Cl.
  *B01D 21/00* (2006.01)
  *B01D 21/24* (2006.01)
  *B01D 21/30* (2006.01)

(52) U.S. Cl.
  CPC ..... *B01D 21/0042* (2013.01); *B01D 21/0087* (2013.01); *B01D 21/2444* (2013.01); *B01D 21/30* (2013.01)

(56) References Cited

U.S. PATENT DOCUMENTS

| | | | |
|---|---|---|---|
| 5,403,473 A * | 4/1995 | Moorehead | B01D 21/267 210/232 |
| 2011/0048233 A1* | 3/2011 | Menke | C02F 3/2846 96/207 |
| 2015/0238979 A1* | 8/2015 | Cabezas Morales | B01D 45/02 55/346 |
| 2019/0210042 A1* | 7/2019 | Kompala | C12Q 3/00 |

FOREIGN PATENT DOCUMENTS

| | | |
|---|---|---|
| CN | 102225383 A | 10/2011 |
| CN | 102430485 A | 5/2012 |
| CN | 205099459 U | 3/2016 |
| CN | 106964502 A | 7/2017 |
| DE | 3509789 A1 | 10/1986 |
| FR | 2293402 A1 | 7/1976 |
| WO | 9501215 A1 | 1/1995 |
| WO | 96/32177 A1 | 10/1996 |
| WO | 98/11976 A1 | 3/1998 |
| WO | 2005/095288 A1 | 10/2005 |
| WO | 2010/036107 A1 | 4/2010 |
| WO | 2016089874 A1 | 6/2016 |

* cited by examiner

SPIRAL-SHAPED SEPARATION DEVICE FOR FLUID PURIFICATION DEVICE

FIELD OF THE INVENTION

The present invention relates to a separation device for a fluid purification device and to a method for separating liquid from solids and gas using the separation device, and more specifically to a separation device comprising spiral-shaped channels.

BACKGROUND ART

Separation or settling devices for fluid purification devices are known from the prior art. They can be used for aerobic or anaerobic purification of fluid such as waste water. The waste water comprises liquid and also usually contains dissolved and not dissolved organic and/or inorganic material in the form of solids or solid particles.

Anaerobic wastewater treatment is the biological treatment of wastewater without the use of air or elemental oxygen. Many applications are directed towards the removal of organic pollutants in waste water, slurries and sludge. The organic pollutants are converted by anaerobic microorganisms to a gas containing methane and carbon dioxide, known as "biogas". Separation devices known in the art allow to separate the liquid, solids and gas, including biogas, constituting the fluid (waste water) from each other.

An example is disclosed in WO 96/32177, which is incorporated by reference, and which discloses a separation device comprising a settling chamber, in which caps are disposed with their longitudinal axis at an angle with respect to the water level, such that fluid, comprising liquid, solids and gas, which is supplied at the bottom of the separation device, flows obliquely up, forced along the bottom of the caps. Gas bubbles are collected at a ridge located in the caps. Underneath the caps, a laminar flow can be realized, which promotes the deposition of solids contained in the fluid.

Another example is disclosed in WO 2010/036107 A1, incorporated by reference, which shows a separation device to be used in combinations of different techniques (hybrid reactor systems) such as anaerobic filters and/or anaerobic lagoons. The separation device of WO 2010/036107 A1 comprises a settling chamber configured to be filled with the fluid; a liquid-discharge for discharging liquid from the settling chamber, the liquid discharge being arranged so as to be fitted close to the liquid level, a fluid inlet configured to supply the fluid into the settling chamber, a particulate material separation device and a sludge outlet for discharging fluid containing sludge. The fluid inlet further comprises a gas separation device to separate gas from the fluid, said gas separation device comprising channels.

The settler devices of the art, such as the ones of WO 96/32177 or WO 2010/036107 A1, although achieving a certain separation efficiency, present several structural challenges. They require a cubical or prism structure, which can lead to an uneven distribution of fluid if used in a round reactor tank. The settling plates or caps need to have a specific angle which requires the separation device to have a specific size. Additionally, the large flat settler plates or caps may not be robust enough against overpressure or under pressure.

SUMMARY OF THE INVENTION

According to the present invention, a separation device is provided which solves at least some of the problems indicated above.

According to a first aspect, the invention provides a separation device for a fluid purification device, the separation device comprising: at least three concentric enclosures including an outermost enclosure and an innermost enclosure and defining at least two concentric cavities; a plurality of spiral-shaped channels formed in each of the at least two concentric cavities, so that fluid can flow through said plurality of spiral-shaped channels; a fluid inlet, for receiving fluid, located in an upper section of an outermost cavity among the at least two concentric cavities; a solids outlet, for discharging solids comprised in the fluid, located in a lower section of the separation device; and a liquid outlet, for discharging liquid comprised in the fluid, located in an upper section of at least one inner cavity among the at least two concentric cavities.

Advantageously, the invention provides a separation device with a compact structure, comprising a plurality of concentric enclosures defining a plurality of cavities and forming, in these cavities, spiral-shaped channels to allow fluid to run there through. The spiral-shaped channels formed in each cavity, in comparison with rectangular/squared inclined settler plates as used in the art, require a smaller projection area and provide a more robust structure, which can withstand overpressure and under pressure in a more effective way.

The liquid can run through the spiral-like channels of the different cavities and leave the separation device through a fluid outlet located, in operation, in an upper section of at least one of the inner cavities, while the solids may leave the separation device through a solids outlet located, in operation, in a lower section of the separation device. Here, upper section of the cavities can be understood as an upper half of the cavities, or an upper third, or even the top opening of the cavities.

The concentric enclosures can also be referred to as concentric structures, bodies, frames, or the like, and they may have different shapes as long as they are concentric, that is, having a common longitudinal axis. They may for example have a tubular shape, such as a cylindrical shape defined by a circular horizontal cross-section, and they can also have an elliptic-cylindrical shape, defined by an elliptical horizontal cross-section, or they can have a polygonal shape, defined by for example a rectangular (such as square), hexagonal, or octagonal horizontal cross-section, or any other suitable shape.

The concentric cavities can also be referred to as concentric chambers or concentric spaces, where the spiral-shaped channels are located. The concentric enclosures and concentric cavities can be referred to throughout the description as simply enclosures or cavities.

The spiral-shaped channels according to the present invention may connect each concentric enclosure with the next concentric enclosure, so that the only way for the fluid to flow is through the spiral-shaped channels.

The spiral-shaped channels can be also referred to throughout the present description as channels, and the spiral-shaped walls can also be referred to as walls.

According to an embodiment, the plurality of spiral-shaped channels in each concentric cavity extend parallel to each other so as to define one single spiral formation. The plurality of spiral-shaped channels preferably extend around a vertical axis, and the channels in each concentric cavity run preferably parallel and in contact with each other, so that they occupy the total space in the cavity and define a single spiral formation.

According to an embodiment, the lower section of the separation device comprises a redirecting chamber located below the at least three concentric enclosures, the redirecting chamber being configured to allow the fluid to switch from a downward flow through the plurality of spiral-shaped channels of the outermost cavity, to an upward flow through the plurality of spiral-shaped channels of the at least one inner cavity.

Fluid enters the separation device through an upper section of the outermost cavity. In the outermost cavity, fluid flows downwards through the spiral-shaped channels. When the fluid reaches a bottom area of the outermost cavity, that is, when it reaches a redirecting chamber which is a delimited space located below the at least three concentric enclosures, it switches direction, due to its own energy, and flows upwards through the spiral-shaped channels of the at least one inner cavity. In this at least one inner cavity, the solids will fall downwards, against the fluid flow, due to their higher density, by coming into contact with the walls of the channels and sliding down. The walls of the channels thus function as separation plates, such as the flat and straight separation plates known in the art. The fluid will become cleaner as it flows upwards, and clean liquid (water) will reach the upper section of the at least one inner cavity.

According to an embodiment, the lower section of the separation device comprises a solids collection chamber located below the at least three concentric enclosures and including the redirecting chamber, wherein the solids outlet is located in a bottom part of the solids collection chamber. The lower section refers to the section located below the concentric enclosures. The solids collection chamber collects the solids that separate from the fluid and slide down through the spiral-shaped channels of the cavities. An upper end of the solids collection chamber may be connected or affixed to the bottom of the outermost enclosure, thereby creating a space in the upper portion of the solids collection chamber, called the redirecting chamber, where the fluid which reaches the bottom of the outermost cavity can turn from a downward flow to an upward flow and continue to flow upwards through the spiral-shaped channels of the at least one inner cavity.

According to an embodiment, the fluid inlet corresponds to a gas outlet. In the outermost cavity, as liquid and solids comprised in the fluid flow downwards, (most of) the gas particles move upwards and leave the separation device through a gas outlet, which corresponds to (is the same as or partially the same as) the fluid inlet. Thus, in the outermost cavity, a gas separation phase takes place, and in the at least one inner cavity, a solids separation phase takes place, so that when the fluid reaches an upper section of the at least one inner cavity, the fluid has become liquid, such as clean water, which is now free or almost free from any solids and gas particles.

According to an embodiment, a top of the outermost cavity is open thereby defining an outermost top opening, and the fluid inlet comprises an area formed by the outermost top opening. The top end of the outermost cavity may be uncovered, unclosed, and the separation device is preferably located inside the reactor with its top part at the water level or below the water level, so that the fluid in the reactor can enter the separation device from all directions, and not just from a specific location where an inlet is placed. The fluid inlet may thus be defined as the total area defined by the open top end of the outermost cavity, also called outermost top opening. Allowing the fluid to enter the separation device from all directions has the advantage of improving the flow distribution and simplifying the system design, as no account has to be taken of a specific position where an inlet is to be placed.

According to an embodiment, the separation device further comprises a delimiting structure for separating the outermost top opening from at least one inner top opening, also called the top opening of the at least one inner cavity. This delimiting structure ensures that the outermost top opening, which may form the fluid inlet (and may also form the gas outlet), is separated from the opening of the at least one inner cavity, so that the fluid entering through the fluid inlet and the clean liquid leaving through the liquid outlet do not come into contact with each other.

According to an embodiment, the delimiting structure comprises a delimiting enclosure located above and in contact with a second outermost concentric enclosure, and the at least one inner top opening is confined by the delimiting enclosure and the innermost enclosure, thereby forming a liquid collection section. The liquid collection section is a section for collecting liquid (almost) free of solids and gas, such as clean water. The liquid collection section may be placed above the concentric enclosures, being delimited by the delimiting enclosure and the innermost enclosure, and the liquid flowing upwards through the spiral-shaped channels of the least one inner cavity may reach the liquid collection section following its natural flow.

According to an embodiment, the innermost enclosure comprises at least one collection opening in an upper section thereof to allow liquid in the liquid collection section to enter an internal chamber, and wherein the separation device further comprises at least one liquid collection pipe protruding from the innermost enclosure towards the outside of the separation device, so as to collect the liquid in the internal chamber. The innermost enclosure may be higher than the other enclosures, or an additional enclosure may be attached to the top of the innermost enclosure, so that the part of the innermost enclosure that extends beyond the height of the other concentric enclosures is considered the upper section. This upper section may confine the liquid collection section, and the at least one collection opening is preferably located in this section so that liquid from the liquid collection section can enter the internal chamber.

According to an embodiment, the liquid collection section comprises at least one division element, so as to divide the liquid collection section into at least two compartments, and the innermost enclosure comprises at least one collection opening for each of the at least two compartments. The division elements may comprise at least one division wall which extends from the innermost enclosure radially towards the delimiting enclosure and contacts it, thereby dividing the liquid collection section into at least two compartments, preferably into four compartments. By having at least one collection opening for each compartment, the water can enter the internal chamber through the different compartments.

According to an embodiment, the separation device comprises a compartment control mechanism to close at least one of the collection openings thereby stopping liquid from leaving said at least one compartment. This compartment control mechanism allows to control velocity at which clean water leaves the separation device, as it allows to close the collection opening of one or more compartments.

According to an embodiment, the plurality of spiral-shaped channels are defined by spiral-shaped walls which have an inner region and an outer region with respect to a vertical cross-section of the concentric structure, wherein the spiral-shaped walls are curved upwards from the inner region towards the outer region, or curved downwards from the inner region towards the outer region.

The plurality of spiral-shaped channels may be defined by spiral-shaped walls comprising an upper end, located at the top of the enclosure, and a lower end, located at the bottom of the enclosure, wherein the fluid flowing through the channels flows from the upper end to the lower end, or from the lower end to the upper end. Each wall also comprises two surfaces, a front surface and a back surface, wherein the front surface is the surface which the solid particles mostly contact and through which they slide down. With respect to a vertical cross-section (as will be seen clearly from the drawings), there is an inner region of the wall extending close to and including the inner edge of the wall. The spiral-shaped walls may connect one enclosure to the next concentric enclosure. In one embodiment, a horizontal cross section of each wall defines a line which radially extends towards the centre of the concentric enclosures. In such configuration, the walls may have a flat surface running from the upper end to the lower end. In another, more preferred, configuration, the walls are arranged such that a horizontal cross section of each wall does not extend radially towards the centre, but has a specific inclination angle with respect to said direction. In this configuration, the wall surfaces running from the upper end to the lower end are not flat, but are either curved downwards from the inner region towards the outer region, forming an arched or concave-like shape, or curved upwards from the inner region towards the outer region, thereby forming an arched or convex-like shape.

According to an embodiment, the plurality of spiral-shaped walls of the outermost cavity are curved downwards from the inner region towards the outer region, and the plurality of spiral-shaped walls of the at least one inner cavity are curved upwards from the inner region towards the outer region. This configuration provides the advantage of allowing solids which contact the walls to slide downwards closer to the outer region in the outermost cavity, and allowing solids to move downwards closer to the inner region in the at least one inner cavity.

According to an embodiment, a distance between each concentric enclosure and the next enclosure is between 25 millimetres and 800 millimetres, preferably between 50 millimetres and 800 millimetres, more preferably between 50 millimetres and 500 millimetres, more preferably between 50 millimetres and 200 millimetres. For smaller separation devices, a distance of between 25 millimetres and 200 millimetres, preferably between 25 millimetres and 100 millimetres is also preferred.

According to an embodiment, the at least three concentric enclosures correspond to at least three concentric tubes and the at least two concentric cavities correspond to at least two concentric rings. In a preferred embodiment of the invention, the enclosures have a tubular shape, such as a cylindrical shape defined by a circular horizontal cross-section. In this preferred embodiment, the cavities defined therewith have ring shapes. This allows the separation device to be fit in a round reactor tank and to provide an even fluid distribution, which cannot be achieved with separation devices with a rectangular horizontal cross-section. Additionally, a cylindrical shape combined with the spiral-shaped channels, provides a much stiffer structure of the separation device, and it allows to reduce the thickness of the walls forming the channels, because they are no longer long and straight.

According to an embodiment, the separation device comprises at least four concentric enclosures defining at least three concentric cavities. This structure provides one outermost cavity where the fluid may flow downwards, and at least two inner cavities for the fluid to flow upwards. In a concentric structure, the outermost enclosure has a larger diameter and therefore can be provided with more channels than the inner cavities, thereby carrying more fluid. By having at least two inner cavities, the channels of the inner cavities can have more suitable dimensions and the system can provide better performance.

According to an embodiment, the solids collection chamber has a hollow inverted conical shape. If the concentric enclosures have a cylindrical shape, the solids collection chamber may have a conical shape such that the base of the cone is open and the circumferential edge is connected to the outermost cylinder.

According to an embodiment, the separation device further comprises an aeration device located at an outside part of a lower half of the solids collection chamber, so as to supply gas (biogas or air) from underneath the separation device. This allows to control the volume of gas generated in the reactor where the separation device is located, so as to control a density difference between the liquid, solids and gas outside the separation device, and the liquid and solids inside the separation device, thereby achieving a desired flow of liquid and solids inside the separation device.

According to an embodiment, the plurality of spiral-shaped channels are defined by spiral-shaped walls with an irregular surface. The surface of the walls, whether it is the front surface or the back surface, may be smooth, with no rugosity. However, the surface of the walls may also be irregular, uneven or corrugated. This may improve the gas separation.

According to a second aspect, the invention provides a method of separating a fluid containing liquid, gas and solids, the method being performed by a separation device comprising at least three concentric enclosures including an outermost enclosure and an innermost enclosure, and defining at least two concentric cavities; a plurality spiral-shaped channels formed in each of the at least two concentric channels, the method comprising the steps of: receiving fluid through an upper section of an outermost cavity among the at least two concentric cavities; allowing the fluid to flow downwards through the plurality of spiral-shaped channels of the outermost cavity; when the fluid reaches a redirecting chamber located below the outermost cavity, allowing the fluid to switch from a downward flow through the plurality of spiral-shaped channels of the outermost cavity to an upward flow through the plurality of spiral-shaped channels of at least one inner cavity and, when reaching an upper section of the at least one inner cavity converted into liquid, allowing the liquid to leave the separation device; and allowing solids to move downwards through the plurality of spiral-shaped channels of the outermost cavity and through the plurality of spiral-shaped channels of the at least one inner cavity and to leave the separation device through a lower section of the separation device.

According to an embodiment, the method further comprises, while the fluid flows downwards through the plurality of spiral-shaped channels of the outermost cavity, allowing gas to move upwards and leave the separation device through the upper section of the outermost cavity.

According to an embodiment, receiving fluid through the upper section of the outermost cavity comprises receiving fluid thorough a total area of an outermost top opening.

According to an embodiment, allowing the liquid to leave the separation device through an upper section comprises allowing the liquid to reach a liquid collection section located above the at least three concentric enclosures.

According to an embodiment, the method further comprises allowing the liquid in the liquid collection section to enter an internal chamber in an innermost cavity through at least one collection opening, and to leave the separation device through at least one liquid collection pipe connected to the innermost enclosure.

According to an embodiment, allowing the solids to leave the separation device through a lower section of the separation device comprises allowing the solids to move downwards towards a solids collection chamber located below the at least three concentric enclosures.

According to an embodiment, the method further comprises supplying gas from underneath the separation device through an aeration device located at an outside part of a lower half of the solids collection chamber.

According to an embodiment, the plurality of spiral-shaped channels are defined by a plurality of spiral-shaped walls, respectively, wherein each spiral-shaped wall comprises an inner region and an outer region, and the method further comprises, in the outermost cavity, directing the solids comprised in the fluid flowing downwards towards the outer region of the spiral-shaped walls and, in the at least one inner cavity, directing the solids comprised in the fluid flowing upwards towards the inner region of the spiral-shaped walls.

According to an embodiment, the liquid collection section is divided into at least two compartments, and the method further comprises controlling the liquid collection section to allow to close at least one compartment thereby stopping liquid from leaving said compartment.

BRIEF DESCRIPTION OF THE DRAWINGS

The present invention will be discussed in more detail below, with reference to the attached drawings, in which.

Figure 1A:
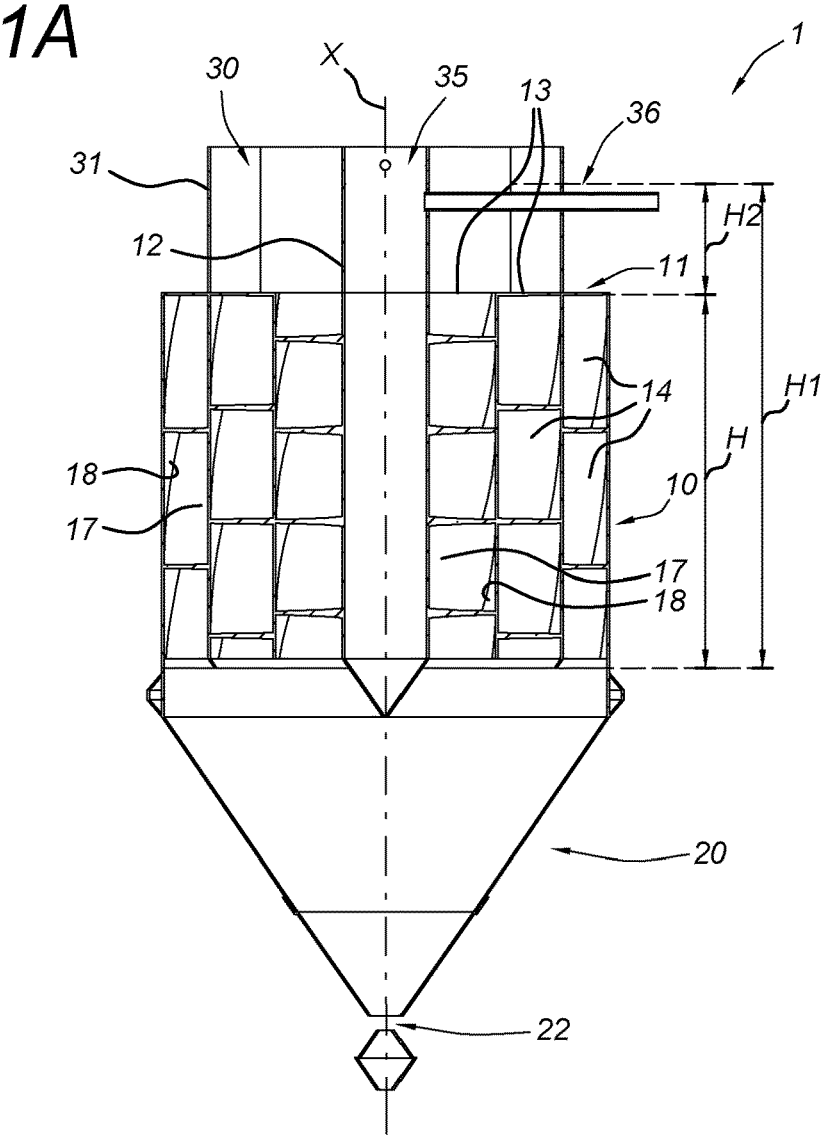
FIG. 1A illustrates a vertical cross-section of a separation device according to an embodiment of the present invention.

The figures are meant for illustrative purposes only, and do not serve as restriction of the scope or the protection as laid down by the claims.

DESCRIPTION OF EMBODIMENTS

An application of a purification process using a separation device according to the invention comprises a reactor tank. Examples are aerobic, anaerobic or anoxic reactors. Anaerobic granular sludge bed technology refers to a reactor concept or purifier for the anaerobic treatment of wastewater.

Preferably, the top part, preferably the top edge, or the top surface, of the separation device of the present invention is located at the water level in an aerated reactor tank, so that the remaining parts of the separation device are located below the water level, since in such tank the density difference between outside the separation device (aerated) and inside the separation device (not aerated) will create a fluid flow through the separation device which will return settled solids or solid particles from the separation device back to the same or another reactor tank within the fluid separation device. However, in another embodiment, the separation device can also be located completely below the water level or even at the bottom of the reactor.

A reactor, such as an Upflow Anaerobic Sludge Blanket (UASB) or expanded granular sludge bed (EGSB), or an aerobic reactor, according to the invention, comprises a tank having a fermentation chamber. Waste water is distributed into the tank, in an embodiment, at appropriately spaced inlets. The waste water passes upwards through a(n anaerobic) sludge bed where microorganisms in the sludge come into contact with waste water substrates. In an embodiment the resulting anaerobic degradation process in the fermentation chamber is responsible for the production of gas (e.g. biogas containing $CH_4$ and $CO_2$). The upward motion of released gas bubbles causes hydraulic turbulence that provides reactor mixing without any mechanical parts. The fluid is continuously in motion in the fermentation chamber due to gas flows that find their way upwards through the fluid towards the liquid level.

Preferably at the top of the reactor, the water phase is separated from sludge solids and gas in a three-phase separator (also known the gas-liquid-solids separator), settling device or separation device, which is the object of the present invention.

Although the description will be made based on fluid in general, it is preferably applied to waste water, but it should be apparent for a skilled person that any other suitable fluid can be used.

Before undergoing a detailed description of the figures, it should be noted that throughout the application, terms such as above, below, upper/lower section, upper/lower part, and the like, are used. Although not specifically indicated, these definitions refer to a position in which the separation device is in operation, or ready to be in operation.

Also throughout the description, terms such as vertical cross-section and horizontal cross-section are used. A vertical cross-section should be understood as a cross-section made along a longitudinal plane including a longitudinal axis (represented by X in at least some of the figures), and a horizontal cross-section should be understood as a cross-section made along the transversal plane including a transversal axis (represented as Y in at least some of the figures). Throughout the figures, like numbers refer to the same features.

Figure 1B:
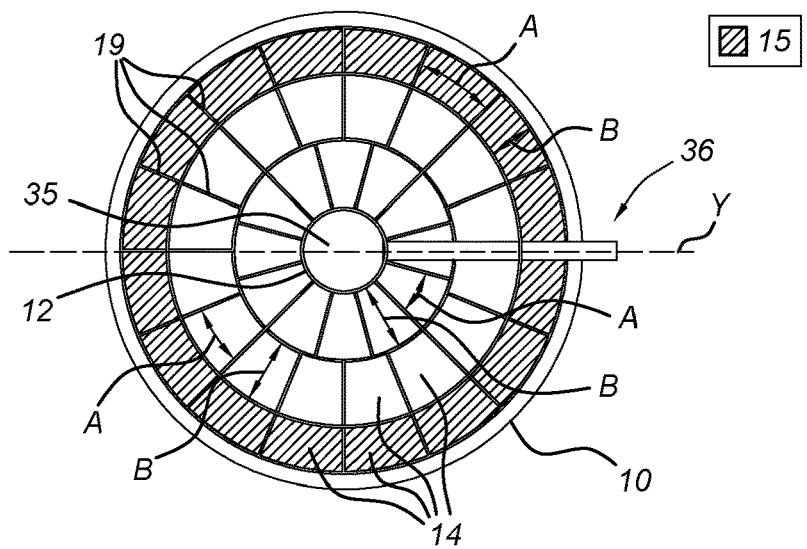
FIG. 1B illustrates a horizontal cross-section of a separation device according to an embodiment of the present invention.

FIG. 1A illustrates a vertical cross-section of a separation device according to an embodiment of the present invention. FIG. 1B illustrates a horizontal cross-section of a separation device according to an embodiment of the present invention. Both figures will be described simultaneously as they provide complementary information and some features can be better appreciated in one figure or in the other.

The separation device 1 according to FIG. 1A and FIG. 1B comprises a concentric structure comprising at least three concentric enclosures, among which there is an outermost enclosure 10 and an innermost enclosure 12. The at least three concentric enclosures define at least two concentric cavities including an outermost cavity 11 and one or more inner cavities 13. In the embodiment of FIG. 1A and FIG. 1B, the concentric enclosures correspond to concentric tubes, more specifically concentric cylinders, having a circular horizontal cross-section, and the cavities correspond to rings. However, it should be noted that this is only one possibility, one preferred embodiment, but the concentric enclosures can have a polygonal shape, such as by being defined by a rectangular (even square) horizontal cross-section, or an hexagonal, or an octagonal horizontal cross-section, or any other suitable shape.

Additionally, the embodiment of FIG. 1A and FIG. 1B shows four concentric enclosures defining three concentric cavities. This is a preferred embodiment, in which the outermost cavity 11 corresponds to a degassing section where a degassing phase can take place, and the two inner cavities 13 correspond to a settling section where the solids separation can take place. This settling section is thus divided into two cavities. This configuration is advantageous because the length A of a circular sector defining the spiral-shaped channels 14, in the case of the inner cavity 13, can otherwise be too small if only one inner cavity is used. By using at least two inner cavities 13, the number of spiral-shaped channels 14 of each inner cavity can be decreased while keeping a sufficient length for A. Furthermore, the angle of the spiral-shaped channels 14 with respect to the vertical plane is smallest for the outermost cavity and increases towards the inner cavities. If only one inner cavity is used, this angle will be too steep at the inner cavity. By using at least two inner cavities, the angle of the channels 14 in the inner cavities 13 (i.e. the pitch of the spiral-shaped channels) can be decreased.

The distance B represents the width of a concentric cavity, which is the same or substantially the same as the width of a channel 14. The distance B can have a value of between 25 millimetres and 800 millimetres, preferably between 50 millimetres and 800 millimetres, more preferably between 50 millimetres and 500 millimetres, and even more preferably between 50 millimetres and 200 millimetres. For smaller separation devices, a distance of between 25 millimetres and 200 millimetres, preferably between 25 millimetres and 100 millimetres is also preferred. As seen in FIG. 1B, the distance B is smaller for the outermost cavity 11 than for the second outermost cavity, or middle cavity, which is at the same time smaller than the distance B for the innermost cavity. However, this is only an example, and other lengths for B can be used. The values of A and B, for the channels in the outermost cavity 11, are determined so that their proportion and the size of the channels allows the gas to move up and leave the device. The values of A and B for the inner cavities 13, on the other hand, are determined so that their proportions and the size of the channels allows the solids to move down against the liquid flow, and therefore it depends on the fluid characteristics.

To ensure that the water flow velocity in the two inner cavities is equal, the pressure drop in both inner cavities 13 must be equal. The pressure drop is defined as the difference in total pressure between two points of a fluid carrying network, and a pressure drop occurs when frictional forces, caused by the resistance to flow, act on a fluid as it flows through the tube. The pressure drop depends on a friction coefficient, on the density of the water, on the length of the spiral-shaped channels 14 from the top end to the bottom end, which is the length of the path the fluid has to traverse in the channels 14, on the hydraulic diameter of the channels 14, and on the velocity of the fluid.

Taking this into consideration, the number of channels, the pitch of the spiral-shaped channels and the diameters of the sections can be chosen in such a way, that the velocity in both sections is equal.

An embodiment with three concentric enclosures defining two concentric cavities is also possible, and also an embodiment comprising more than four concentric enclosures defining more than three concentric cavities.

The separation device 1 further comprises a fluid inlet 15, which is located in an upper section of the outermost cavity 11. Said upper section is preferably an upper half or an upper third, and more preferably the fluid inlet 15 is formed in a top of the outermost cavity 11, which is preferably not covered thereby defining an outermost top opening, so that the fluid inlet 15 comprises an area formed by the outermost top opening. In such configuration, the fluid in the reactor tank where the separation device is located can enter the separation device from all directions, and not just from a specific location at which an inlet is placed.

The fluid inlet 15 may also act as a gas outlet. That is, as the fluid flows downwards through the spiral-shaped channels 14 of the outermost cavity 11, gas particles separate from the fluid and move upwards, leaving the separation device through the gas outlet (fluid inlet). A gas collection system including pipes can be used to collect the gas, or the gas may simply rise and leave the separation device 1.

Below the concentric structure, in operation, a solids collection chamber 20 may be located, connected or affixed to the bottom end of the outermost enclosure 10 and defining a chamber, called a redirecting chamber, where the fluid, after reaching the bottom of the spiral-shaped channels 14 of the outermost cavity 11, can turn from a downward flow to an upward flow, using the own energy of the fluid. The fluid then may flow upwards through the spiral-shaped channels 14 of the at least one inner cavity 13, in this embodiment two inner cavities. While the fluid is flowing down through the channels 14 of the outermost cavity 11 and flowing up through the channels 14 of the inner cavities 13, solid particles may separate from the liquid because of their higher density and because of the friction with the surface of the channels 14, and fall down, settling at the bottom of the solids collection chamber 20 to then leave the solids collection chamber 20 through a solids outlet 22 located preferably at the bottom of the solids collection chamber.

The solids collection chamber 20 can have several shapes. However, in the embodiment of FIG. 1A and FIG. 1B, it has a conical shape, to improve its attachment with the concentric structure, which can be achieved by attaching or engaging the circumferential edge of the cone base to the bottom of the outermost enclosure 10. However, it should be noted that other shapes are possible as long as the solids collection chamber 20 allows the solids to be collected and removed from the separation device 1, and as long as there is a space allowing the fluid to exit the channels 14 of the outermost cavity 11 and enter the channels 14 of the at least one inner cavity 13.

FIG. 1A and FIG. 1B also show a liquid outlet which comprises a liquid collection section 30 and at least one liquid collection pipe 36. The liquid collection section 30 may be enclosed or delimited by the innermost enclosure 12 and a delimiting structure which separates the top opening of the outermost cavity 11 from the top opening of the inner cavities 13. This delimiting structure is preferably a delimiting enclosure 31, which has a similar shape as the other concentric enclosures, and is placed with one end attached to the top of the second outermost enclosure. This delimiting enclosure can also be clearly seen in FIG. 4 which will be described in more detail below.

The innermost enclosure 12 may be solid, or (partially) hollow. If it is (partially) hollow, it may define an internal chamber 35 which can contribute to the collection of liquid (clean water). The innermost enclosure 12 may have a height H1 larger than the height H of the other concentric enclosures, or, instead, an additional enclosure can be attached to the top of the innermost enclosure providing a larger height defining an upper section, so that said upper section (of height H2) can act as a wall delimiting the liquid collection section 30. In this upper section of the innermost enclosure 12, at least one collection opening 34 (visible in FIG. 4) may be present, in order for the liquid in the liquid collection section 30 to enter the internal chamber 35 and be stored therein. The liquid can then be discharged by means of at least one liquid collection pipe 36 which is connected to the innermost enclosure 12 and collects liquid stored therein. As will be seen with reference to FIG. 4, the liquid collection section can be divided in compartments.

The spiral-shaped channels may be defined by spiral-shaped walls connecting each enclosure with the next enclosure, as is the case of FIG. 1A and FIG. 1B. The spiral-shaped channels may also be defined by spiral-shaped hollow members or hollow arms having a polygonal horizontal cross-section, such as rectangular (square), or other type of polygonal, circular or elliptical horizontal cross-section, said hollow arms being fit in the cavities and being attached to each other and to the enclosures defining the cavities. In a preferred embodiment, the spiral-shaped channels are defined by walls connecting each enclosure with the next one. In another preferred embodiment, the spiral-shaped channels are defined by hollow arms with a square or rectangular horizontal cross-section. These embodiments are preferred because they allow to make a better use of the space and therefore they allow for a higher fluid volume.

In the embodiment of FIG. 1A and FIG. 1B, the plurality of spiral-shaped channels 14 are defined by spiral-shaped walls 19, which have an upper end and a lower end and connect one enclosure to the next concentric enclosure. These spiral-shaped walls 19 have a front surface (or top surface), through which the fluid flows, that is, the surface which the solids mostly contact, and a back surface (or bottom surface). The spiral-shaped walls have also an inner region 17, with respect to a vertical cross-section, extending along the whole length of the wall close to and including the inner edge, and an outer region 18 which similarly extends close to and including an outer edge.

In the embodiment of FIG. 1A and FIG. 1B, a horizontal cross section of each wall 19 defines a line which extends radially towards the centre of the concentric enclosures, said line having substantially the same length as the width (distance B) of the concentric cavity where it is located. In such configuration, the walls have a flat surface running from the upper end to the lower end.

Figure 2:
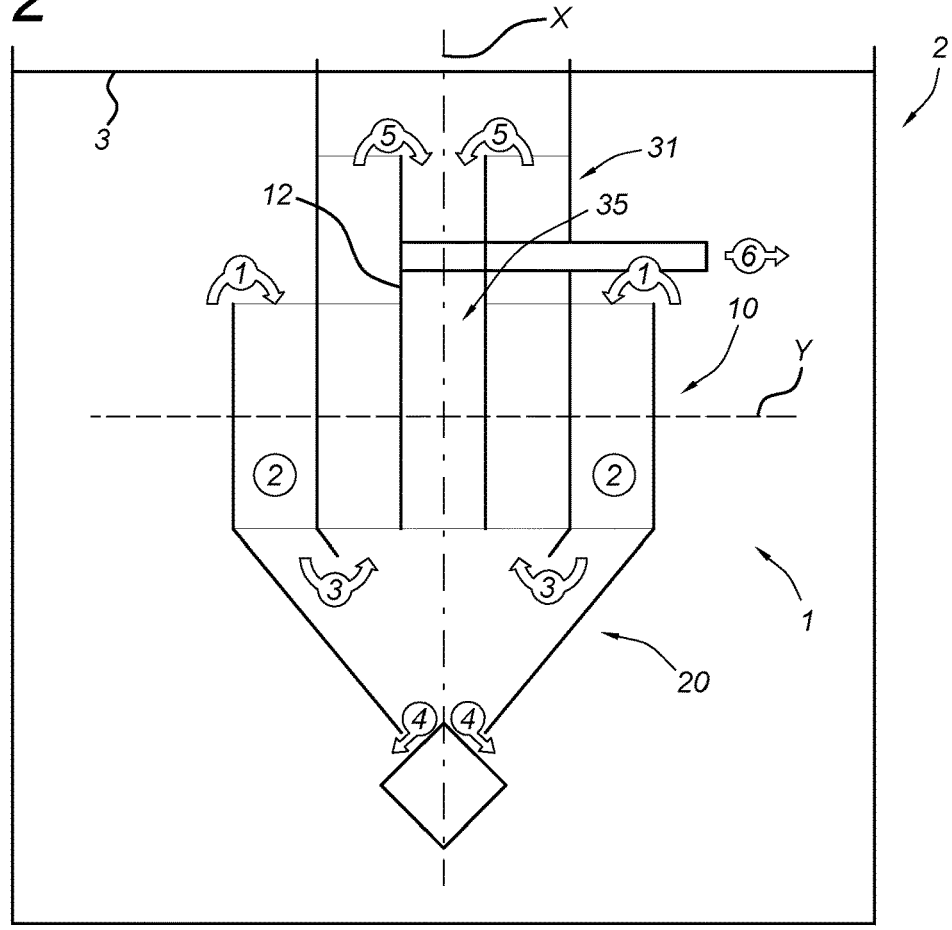
FIG. 2 depicts a vertical cross-section of a separation device according to an embodiment of the present invention when located inside a reactor tank.

FIG. 2 depicts a vertical cross-section of a separation device according to an embodiment of the present invention when located inside a reactor tank. In FIG. 2, the separation device 1 is located inside of a reactor tank, which can be an aerobic or an anaerobic reactor.

The separation device 1 of the embodiment of FIG. 2 is located in an upper part of the reactor 2, such as in an upper half, and with its top part at the fluid level 3 or below the fluid level 3. However, the separation device 1 can also be placed in other locations within the reactor, and the working principle will be the same. For example, the separation device 1 may be located close to or at the bottom of the reactor. A method of separating liquid, solids and gas in a fluid will be described in relation with FIG. 2.

In step 1), fluid such as waste water comprising liquid, solids and gas, is received by the separation device 1 through fluid inlet 15 located in an upper section of the outermost cavity 11, which in this case corresponds to the whole top opening of the outermost cavity 11. The fluid is then, in step 2) allowed to flow downwards through the spiral-shaped channels 14, (most of the) gas comprised in the fluid separates from the fluid, partly due to the friction of the fluid with the surface of the walls defining the channels, which can be smooth or irregular, and the gas moves upwards, leaving the separation device through a gas outlet which corresponds to the fluid inlet 15. In step 3), after the fluid reaches a bottom area of the outermost cavity 11, it reaches a redirecting chamber which is a part of the solids collection chamber 20, and which is a delimited space where the fluid is allowed to switch from a downward flow to an upward flow and to flow upwards through the plurality of spiral-shaped channels 14 of at least one inner cavity 13. When reaching an upper section of the at least one inner cavity 13 converted into liquid, the liquid is allowed to leave the separation device. Step 4) corresponds to the step of allowing solids, which moved downwards through the plurality of spiral-shaped channels 14 of the outermost cavity 11, and which also moved downwards through the plurality of spiral-shaped channels 14 of the at least one inner cavity 13, to leave the separation device 1 through a lower section of the separation device, preferably through a solids outlet 22 located at the bottom of the solids collection chamber 20. In step 5), the liquid (clean water) that has reached the upper section may enter the liquid collection section 30, from where the liquid may access the internal chamber 35 of the innermost enclosure 12 via, for example, at least one collecting opening 34. A liquid collection pipe 36 or any other liquid discharging element can be connected to the innermost enclosure 12 and remove, in step 6), the liquid stored therein. If the internal chamber 35 is not present, the liquid in the liquid collection section 30 can be directly connected by at least one pipe.

Figure 3:
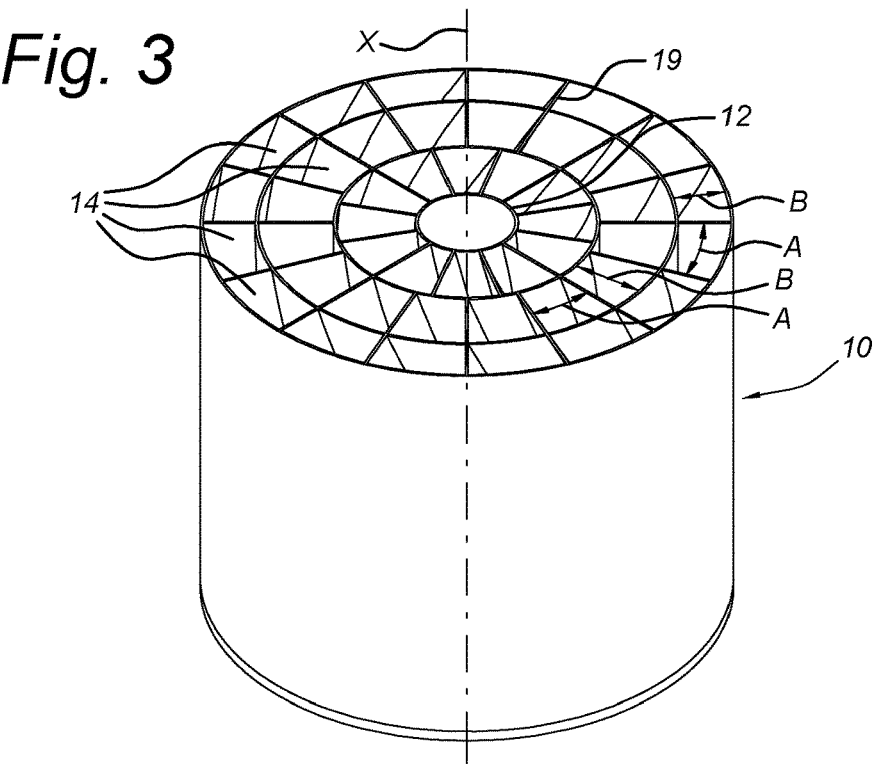
FIG. 3 shows a perspective view of a part of the separation device according to an embodiment of the present invention.

FIG. 3 shows a perspective view of a part of the separation device according to an embodiment of the present invention. In FIG. 3, an upper part of the spiral-shaped channels 14 in the different concentric cavities can be seen. Also the horizontal cross-section of the spiral-shaped walls 19 defining the spiral-shaped channels 14 can be seen, which extend radially towards the center of the concentric enclosures. The distance B represents the width of a concentric cavity, which is the same or substantially the same as the width of a spiral-shaped channel 14 formed in said cavity. As seen above in relation with FIGS. 1A and 1B, the distance B can have different values.

Figure 4:
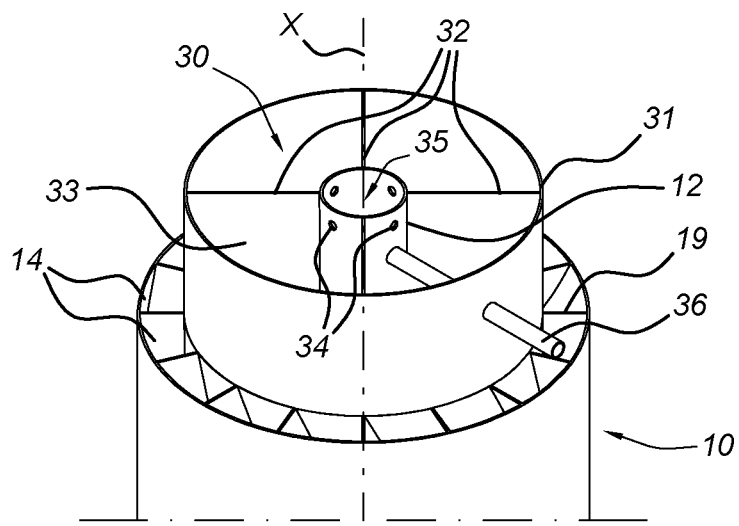
FIG. 4 shows another perspective view of a part of the separation device according to an embodiment of the present invention.

FIG. 4 shows another perspective view of a part of the separation device according to an embodiment of the present invention. FIG. 4 focuses on the liquid collection section 30 located above the concentric enclosures. This liquid collection section 30 may have different elements than those shown in FIG. 4, as the configuration shown in FIG. 4 is merely an example and other configurations are possible. The embodiment of FIG. 4 shows a delimiting enclosure 31 affixed to the top of the second outermost enclosure, and having a height which can be substantially the same as the additional height H2 (see FIG. 1A) of the innermost enclosure 12. The height of the delimiting enclosure 31 may also be larger than the height H2, to ensure that no liquid in the liquid collection section 30 or inside the internal chamber 35 overflows and leaves the separation device.

As seen in the embodiment of FIG. 4, the innermost enclosure 12 comprises at least one collection opening 34 in an upper section thereof (section of height H2 that extends beyond the height of the other concentric enclosures, which can be part of the innermost enclosure or an additional enclosure attached to the top of the innermost enclosure) to allow liquid in the liquid collection section 30 to enter an internal chamber 35. At least one liquid collection pipe 36, or other liquid discharging means, may protrude from the innermost enclosure 12 towards the outside of the separation device 1, so as to collect the liquid from the internal chamber 35.

FIG. 4 depicts four delimiting elements 32 which divide the liquid collection section 30 into four compartments 33. However, it should be noted that, although this is a preferred embodiment, there can be a different amount of delimiting elements and compartments. The delimiting elements 32 of the embodiment of FIG. 4 comprise division walls which radially extend from the innermost enclosure 12 to a position in the delimiting enclosure 31 thereby dividing the liquid collection section 30 into a plurality of compartments 33.

The advantage of having several compartments is that one or more of these compartments can be closed. This mechanism allows to control the velocity of the fluid in the separation device. The innermost enclosure 12 may comprise a plurality of collection openings 34, so that at least one collection opening 34 connects each compartment with the internal chamber 35. The separation device may comprise a compartment control mechanism to close or open at least one of the collection openings 34 based on a desired velocity of liquid in separation device. The compartment control mechanism may comprise a cover or sealing structure which closes at least one of the collection openings 34. The control mechanism may be manually controlled, or may be automatically controlled by means of a sensor system.

In the embodiment of FIG. 4, the delimiting elements 32 extend radially following the radial distribution of the spiral-shaped walls (as seen clearly in FIG. 1B). However, the delimiting elements 32 may have a different shape, adapted to the distribution of the spiral-shaped walls. As will be seen in relation with FIG. 6 to FIG. 8, when the spiral-shaped walls do not extend radially, the delimiting elements 32 have a shape which adapts to the horizontal cross-section of the walls, so as to effectively delimit the compartments of the liquid collection section 30.

Figure 5:
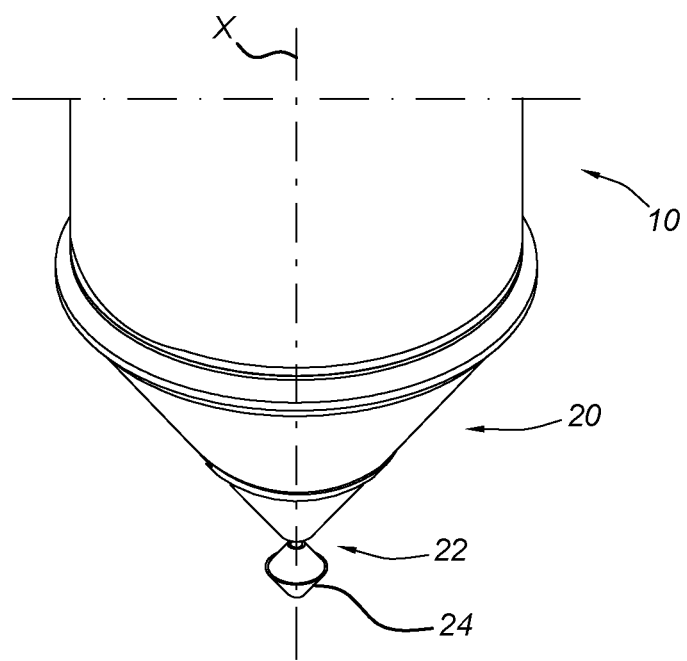
FIG. 5 shows another perspective view of a part of the separation device according to an embodiment of the present invention.

FIG. 5 shows another perspective view of a part of the separation device according to an embodiment of the present invention. Specifically, FIG. 5 depicts a close-up view of the solids collection chamber 20, and is an example of said solids collection chamber 20 having an inverted conical shape with its base open and with an edge region of the base being in contact with the bottom end of the outermost enclosure 10. The solids outlet 22 is located at a bottom part of the solids collection chamber 20. Additionally, the solids collection chamber 20 may comprise a stopper 24 located below the solids outlet 22, configured to prevent air from entering the solids collection chamber 20 while allowing the solids to leave through the solids outlet 22. In a preferred embodiment, the stopper 24 has a conical shape, but the invention is not limited thereto.

According to an embodiment, the separation device further comprises an aeration device located at an outside part of a lower half of the solids collection chamber, so as to supply gas (biogas or air) from underneath the separation device. The liquid and solids flow through the separation device is driven by the density difference of liquid, solids and gas outside the separation device, and only liquid and solids inside the separation device. This density difference is dependent on either the gas (e.g.: biogas) production, or aeration means needed to supply oxygen to the aerated reactor in which the separation device is located. The gas volumes generated are however not necessarily the correct gas volumes for an efficient water and sludge flow over the separation device. This can be avoided by having a dedicated aeration device for supplying either air or biogas from underneath the separator. Preferably, the aeration device is located in the lower half of the solids collection chamber 20, on the outside of the solids collection chamber 20, in proximity to or in contact with the outside surface of the solids collection chamber 20, and above the solids outlet 22. The aeration device may comprise a pipe system with at least one pipe comprising at least one opening, preferably a plurality of openings, so that gas can be supplied through said openings to the reactor, thereby controlling the amount of gas generated, which controls the density difference between outside the separation device and inside the separation device, and allowing to obtain an efficient flow of liquid and solids through the separation device.

Figure 6A:
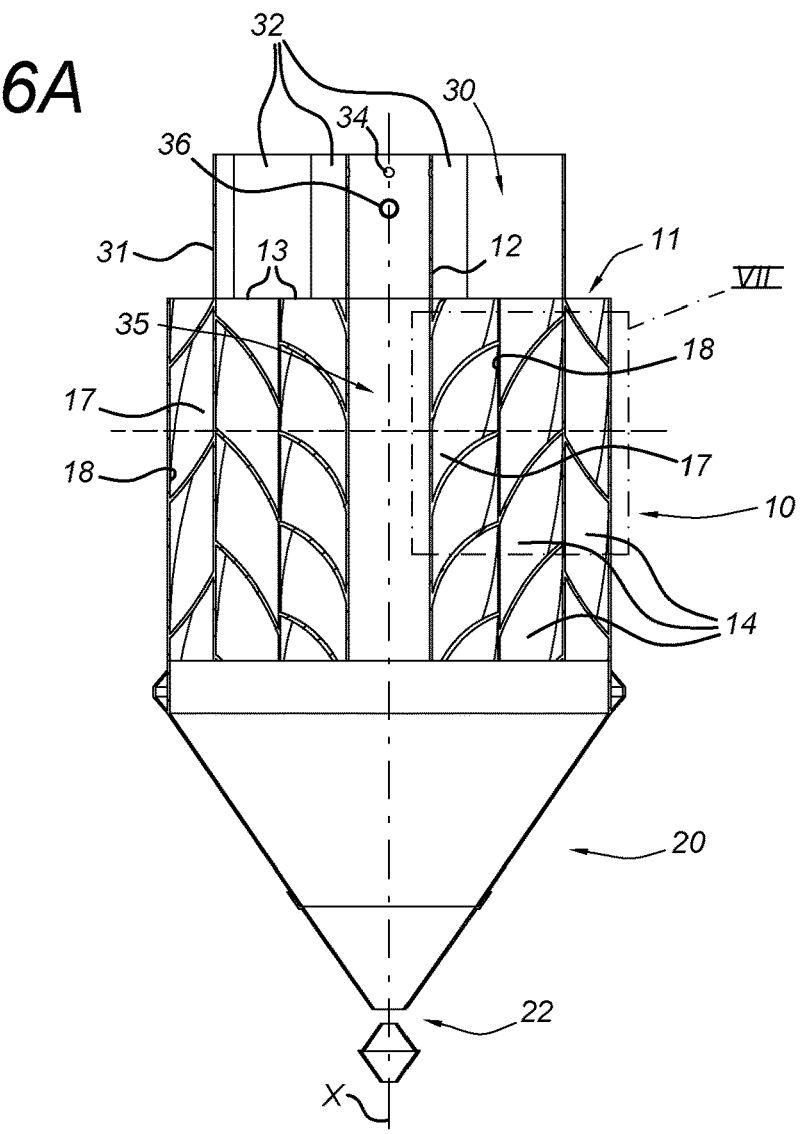
FIG. 6A illustrates a vertical cross-section of a separation device according to an embodiment of the present invention.
Figure 6B:
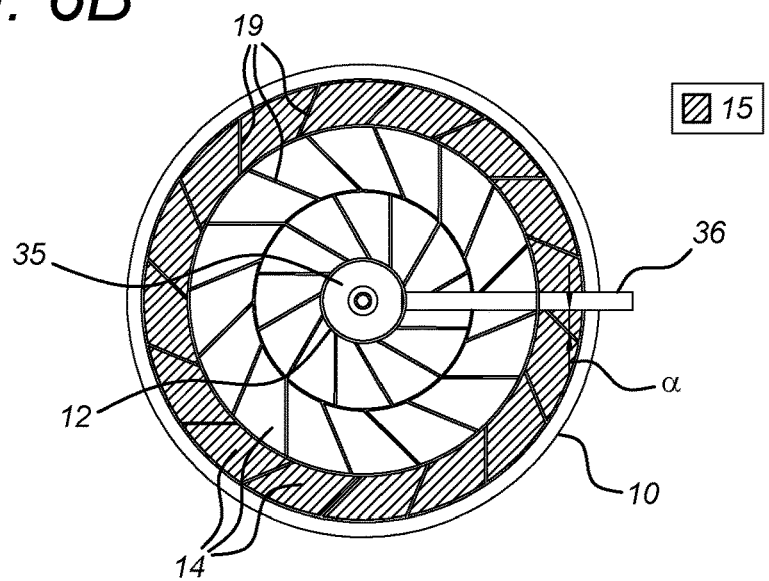
FIG. 6B illustrates a horizontal cross-section of a separation device according to an embodiment of the present invention.

FIG. 6A illustrates a vertical cross-section of a separation device according to an embodiment of the present invention. FIG. 6B illustrates a horizontal cross-section of a separation device according to an embodiment of the present invention. The embodiment of FIG. 6A and FIG. 6B is similar to that of FIG. 1A and FIG. 1B and the similar features will not be described again.

However, the spiral-shaped channels 14 of the embodiment of FIG. 6A and FIG. 6B have a different shape from those of FIG. 1A and FIG. 1B. The plurality of spiral-shaped channels 14 of FIG. 6A and FIG. 6B are defined by spiral-shaped walls 19 which are not flat, and their horizontal cross-section does not radially extend towards the centre of the concentric structure. Instead, the spiral-shaped walls 19 are arranged such that a horizontal cross-section of each wall 19 is inclined with respect to said direction to form a specific angle α, as seen in FIG. 6B, which will be explained in detail below.

Because of their shape, the spiral-shaped walls 19 are not flat, and have, with respect to a vertical cross-section as seen in FIG. 6B, either the inner region 17 curved downwards towards the outer region 18, forming a concave-like shape, or have the inner region 17 curved upwards the outer region, forming a convex-like shape. This implementation has the advantage that the solids comprised in the fluid will tend to move towards one region or the other of the walls 19 while the fluid is flowing downwards or upwards, thereby directing the solids towards a desired location in the separation device. In a preferred embodiment, the plurality of spiral-shaped walls 19 of the outermost cavity 11 have the inner region 17 curved downwards towards the outer region 18 so as to allow solids to move downwards closer to the outer edge, that is, to the outermost concentric enclosure 10. This allows the solids to reach the solids separation chamber 20 closer to the conical walls and therefore they can slide and settle at the bottom of the solids separation chamber 20 in a faster way. In a preferred embodiment, the plurality of spiral-shaped walls 19 of the at least one inner cavity 13 have the inner region 17 curved upwards towards the outer region 18 so as to allow solids to move downwards closer to the inner edge, that is, to the innermost concentric enclosure 12. In the inner cavities 13 where the liquid is moving upwards through the spiral-shaped channels 14, the shape of the walls 19 defining the channels 14 is such that the solids tend to move towards the inner edge, towards the centre, thereby falling almost directly to the bottom of the solids collection chamber 20 going through the shortest route.

The value of the angle α determines the radius of the curve that the spiral-shaped walls 19 define from the inner region 17 to the outer region 18. A larger angle α means a deeper concave or convex shape as described above. The smaller α is, the closer the cross-section of the walls is to the radius of the concentric enclosure, and the flatter the surface of the walls is. Additionally, if a has a positive value (as in the inner cavities of FIG. 6B), it will determine that the inner region 17 is cured upwards towards the outer region 18 (as seen in the inner cavities of FIG. 6A), and if a has a negative value (as in the outermost cavity of FIG. 6B), it will determine that the inner region is curved downwards towards the outer region (as seen in the outermost cavity of FIG. 6A).

Figure 7:
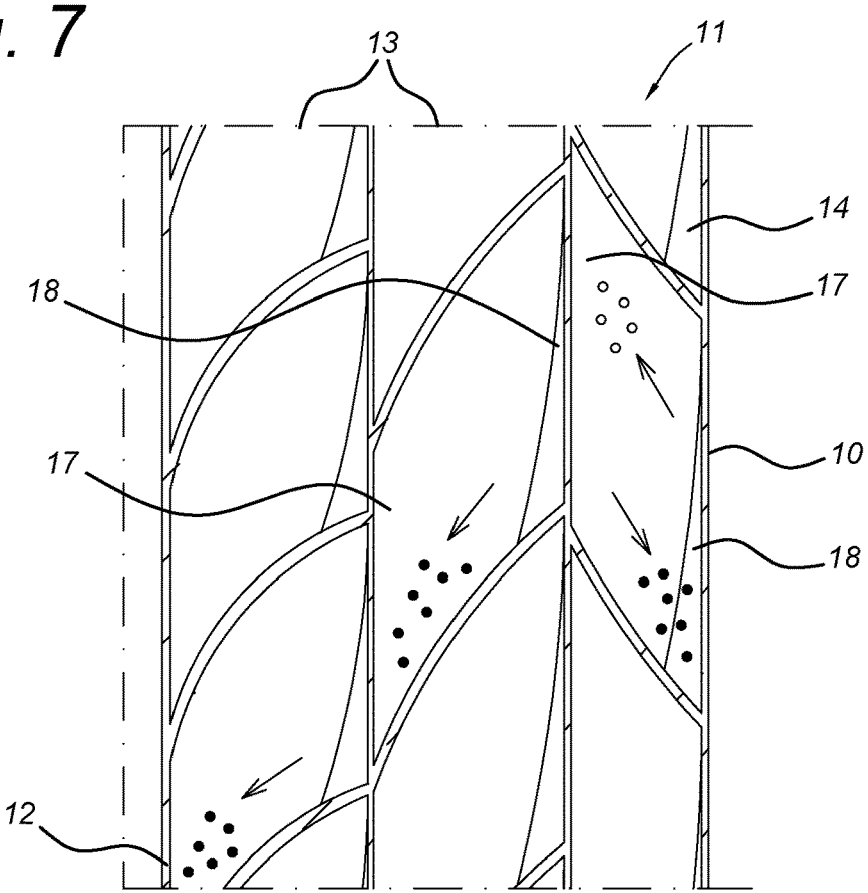
FIG. 7 depicts a close-up view of a part of a separation device according to an embodiment of the present invention.

FIG. 7 depicts a close-up view, marked as VII in FIG. 6A) of a part of a separation device according to an embodiment of the present invention, specifically a partial vertical cross-section showing the center of the concentric enclosure in the right end of the figure. In FIG. 7 it can be more clearly seen how, in an embodiment, the plurality of spiral-shaped walls 19 of the outermost cavity 11 have, with respect to a vertical cross-section, the inner region 17 curved downwards towards the outer region 18, and the solids, represented as dark circles in the figure, tend to move downwards closer to the outermost concentric enclosure, while the gas, represented as white circles in the figure, tends to move upward in an opposite direction. It can also be seen how the plurality of spiral-shaped walls 19 of the at least one inner cavity 13 (two inner cavities 13 in this embodiment) have the inner region curved upwards towards the outer region so as to allow solids to move downwards closer to the innermost concentric enclosure.

Figure 8:
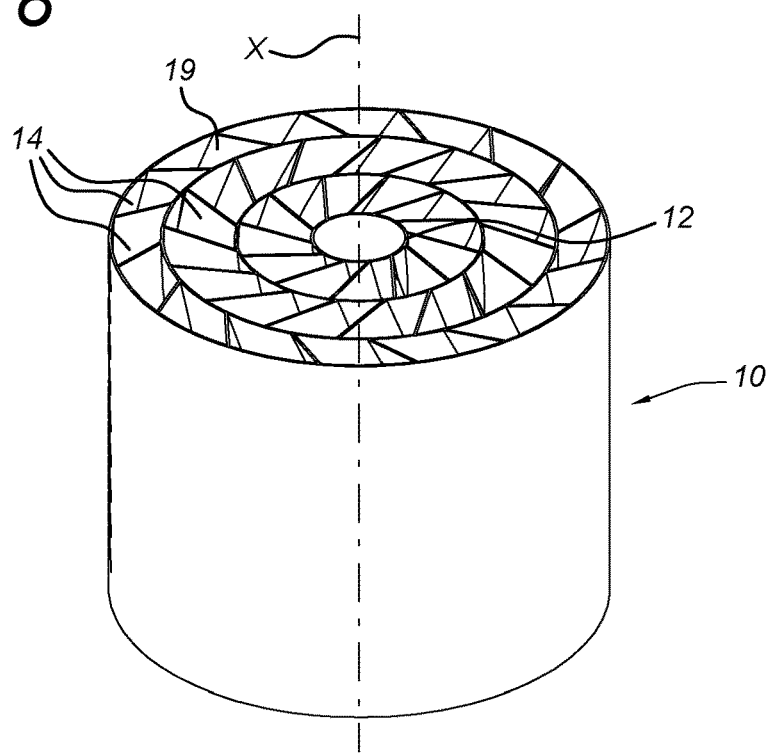
FIG. 8 shows another perspective view of a part of the separation device according to an embodiment of the present invention.

FIG. 8 shows another perspective view of a part of the separation device according to an embodiment of the present invention. The representation of FIG. 8 is very similar to that of FIG. 3, however from FIG. 8 it can be seen that a horizontal cross-section of the walls 19 defining the spiral-shaped channels 14 defines an angle α with respect to the direction of the radius and thus does not follow the radial direction as in the embodiment of FIG. 3.

The figures are meant for illustrative purposes only, and do not serve as restriction of the scope or the protection as laid down by the claims.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE SYMBOLS

Similar reference numbers that have been used in the description to indicate similar elements (but differing only in the hundreds) have been omitted from the list below, but should be considered implicitly included.

1 Separation device
2 Reactor tank
3 Fluid level
10 Outermost enclosure
11 Outermost cavity
12 Innermost enclosure
13 Inner cavity
14 Spiral-shaped channel
15 Fluid inlet=Gas outlet
17 Inner region of spiral-shaped wall with respect to vertical cross-section
18 Outer region of spiral-shaped wall with respect to vertical cross-section
19 Spiral-shaped wall
20 Solids collection chamber
22 Solids outlet
24 Stopper
30 Liquid collection section
31 Delimiting enclosure
32 Division element
33 Compartment
34 Collection opening
35 Internal chamber
36 Liquid collection pipe

The invention claimed is:

1. A separation device for a fluid purification device, the separation device comprising:
at least three concentric enclosures including an outermost enclosure and an innermost enclosure and defining at least two concentric cavities;
a plurality of spiral-shaped walls extending between two of the at least three concentric enclosures such that each of the plurality of spiral-shaped walls forms a horizontal angle with a radial line of the at least three concentric enclosures, wherein the horizontal angle is not zero;
a plurality of enclosed spiral-shaped channels formed in each of the at least two concentric cavities, so that fluid can flow through said plurality of enclosed spiral-shaped channels, wherein each of the plurality of enclosed spiral-shaped channels includes an opening width of at least 25 millimetres, wherein each of the plurality of spiral-shaped channels is enclosed by two of the plurality of spiral-shaped walls and two of the at least three concentric enclosures;
a fluid inlet, for receiving a fluid, located in an upper section of an outermost cavity among the at least two concentric cavities, the fluid inlet corresponding to a gas outlet;
a solids outlet, for discharging solids comprised in the fluid, located in a lower section of the separation device; and a liquid outlet, for discharging liquid comprised in the fluid, located in an upper section of at least one inner cavity among the at least two concentric cavities, wherein the lower section of the separation device comprises a redirecting chamber located below the at least three concentric enclosures, the redirecting chamber being configured to allow the fluid to switch from a downward flow through the plurality of enclosed spiral-shaped channels of the outermost cavity, to an upward flow through the plurality of enclosed spiral-shaped channels of the at least one inner cavity.

2. The separation device according to claim 1, wherein the plurality of enclosed spiral-shaped channels in each concentric cavity extend parallel to each other so as to define one single spiral formation.

3. The separation device of claim 2, wherein the lower section of the separation device comprises a solids collection chamber located below the at least three concentric enclosures and including the redirecting chamber, wherein the solids outlet is located in a bottom part of the solids collection chamber.

4. The separation device according to claim 1, wherein a top of the outermost cavity is open thereby defining an outermost top opening, and the fluid inlet comprises an area formed by the outermost top opening.

5. The separation device according to claim 4, further comprising a delimiting structure for separating the outermost top opening from at least one inner top opening.

6. The separation device according to claim 5, wherein the delimiting structure comprises a delimiting enclosure located above and in contact with a second outermost concentric enclosure, and the at least one inner top opening is confined by the delimiting enclosure and the innermost enclosure, thereby forming a liquid collection section.

7. The separation device according to claim 6, wherein the innermost enclosure comprises the at least one collection opening in an upper section thereof to allow liquid in the liquid collection section to enter the internal chamber, and wherein the separation device further comprises at least one liquid collection pipe protruding from the innermost enclosure towards the outside of the separation device, so as to collect the liquid in the internal chamber.

8. The separation device according to claim 6, wherein the liquid collection section comprises at least one division element, so as to divide the liquid collection section into at least two compartments, and wherein the innermost enclosure comprises at least one collection opening for each of the at least two compartments.

9. The separation device according to claim 8, wherein the separation device comprises a compartment control mechanism to close the at least one of the collection openings thereby stopping liquid from leaving a corresponding compartment.

10. The separation device of claim 1, wherein the plurality of spiral-shaped walls have an inner region and an outer region with respect to a vertical cross-section, wherein each of the plurality of spiral-shaped walls are curved upwards from the inner region towards the outer region, or curved downwards from the inner region towards the outer region.

11. The separation device of claim 10, wherein the plurality of spiral-shaped walls of the outermost cavity are curved downwards from the inner region towards the outer region, and the plurality of spiral-shaped walls of the at least one inner cavity are curved upwards from the inner region towards the outer region.

12. The separation device of claim 1, wherein a distance between each concentric enclosure and the next enclosure is between 50 millimetres and 800 millimetres.

13. The separation device of claim 1, wherein the at least three concentric enclosures correspond to at least three concentric tubes having a cylindrical shape and the at least two concentric cavities correspond to at least two concentric rings.

14. The separation device of claim 1, comprising at least four concentric enclosures defining at least three concentric cavities.

15. The separation device of claim 1, wherein the solids collection chamber has a hollow inverted conical shape.

16. The separation device of claim 3, further comprising an aeration device located at an outside part of a lower half of the solids collection chamber, so as to supply gas from underneath the separation device.

17. The separation device of claim 1, wherein the plurality of enclosed spiral-shaped channels are defined by spiral-shaped walls with a corrugated surface.

18. A method of separating a fluid containing liquid, gas and solids, the method being performed by a separation device comprising at least three concentric enclosures including an outermost enclosure and an innermost enclosure, and defining at least two concentric cavities;

a plurality of spiral-shaped walls extending between two of the at least three concentric enclosures such that each of the plurality of spiral-shaped walls forms a horizontal angle with a radial line of the at least three concentric enclosures, wherein the horizontal angle is not zero; a plurality of enclosed spiral-shaped channels formed in each of the at least two concentric channels wherein each of the plurality of spiral-shaped channels is enclosed by two of the plurality of spiral-shaped walls and two of the at least three concentric enclosures, the method comprising the steps of:

receiving a fluid through an upper section of an outermost cavity among the at least two concentric cavities;

allowing the fluid to flow downwards through the plurality of enclosed spiral-shaped channels of the outermost cavity and allowing gas contained in the fluid to move upwards through the plurality of enclosed spiral-shaped channels of the outermost cavity and to leave the separation device through the upper section of the outermost cavity;

when the fluid reaches a redirecting chamber located below the outermost cavity, allowing the fluid to switch from a downward flow through the plurality of enclosed spiral-shaped channels of the outermost cavity, to an upward flow through the plurality of enclosed spiral-shaped channels of at least one inner cavity and, when reaching an upper section of the at least one inner cavity converted into liquid, allowing the liquid to leave the separation device, wherein each of the plurality of enclosed spiral-shaped channels includes an opening width of at least 25 millimetres; and allowing solids to move downwards through the plurality of enclosed spiral-shaped channels of the outermost cavity and through the plurality of enclosed spiral-shaped channels of the at least one inner cavity and to leave the separation device through a lower section of the separation device.

* * * * *